US010183667B2

(12) United States Patent
Anderson et al.

(10) Patent No.: US 10,183,667 B2
(45) Date of Patent: Jan. 22, 2019

(54) HUMAN PRESENCE DETECTION ON A MOBILE MACHINE

(71) Applicant: Deere & Company, Moline, IL (US)

(72) Inventors: Noel W. Anderson, Fargo, ND (US); Christopher D. Turner, Waterloo, IA (US); Duong M. Le, Cedar Falls, IA (US); Uwe Vollmar, Zweibruecken (DE); Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 124 days.

(21) Appl. No.: 14/854,491

(22) Filed: Sep. 15, 2015

(65) Prior Publication Data

US 2017/0072948 A1 Mar. 16, 2017

(51) Int. Cl.
*B60W 30/09* (2012.01)
*B60W 30/095* (2012.01)
*G05D 1/02* (2006.01)

(52) U.S. Cl.
CPC ........ *B60W 30/09* (2013.01); *B60W 30/0956* (2013.01); *G05D 1/0242* (2013.01); *B60W 2420/40* (2013.01); *B60W 2420/42* (2013.01); *B60W 2550/10* (2013.01); *B60Y 2200/22* (2013.01)

(58) Field of Classification Search
CPC ............... B60W 30/09; B60W 30/095; B60W 2550/10; B60W 2550/12; B60W 10/18; B60W 10/20
See application file for complete search history.

(56) References Cited

U.S. PATENT DOCUMENTS

| 5,412,738 | A | 5/1995 | Brunelli et al. |
| 5,521,515 | A | 5/1996 | Campbell |
| 5,850,470 | A | 12/1998 | Kung et al. |
| 6,601,669 | B1 * | 8/2003 | Agnew ................. B60K 28/10 180/167 |
| 6,768,420 | B2 | 7/2004 | McCarthy et al. |
| 7,116,117 | B2 | 10/2006 | Nakano et al. |
| 7,145,452 | B2 | 12/2006 | Jones |

(Continued)

FOREIGN PATENT DOCUMENTS

| DE | 3211731 | 10/1983 |
| GB | 1212771 A | 11/1970 |
| WO | 2015161208 A1 | 10/2015 |

OTHER PUBLICATIONS

Goubet, Emmanuel, et al., Pedestrian Tracking Using Thermal Infrared Imaging, May 2006, Mitsubishi Electric Research Laboratories, TR2005-126 (Year: 2006).*

(Continued)

*Primary Examiner* — Jelani A Smith
*Assistant Examiner* — Donald J Wallace
(74) *Attorney, Agent, or Firm* — Joseph R. Kelly; Kelly, Holt & Christenson PLLC

(57) ABSTRACT

A mobile machine includes a set of human presence sensors that comprise one or more optical sensors, one or more thermal sensors, and an additional sensor that senses a characteristic of a human. The contribution of the various sensor values generated by the sensors is determined based on environmental conditions. A human presence metric, indicative of human presence, is generated from the contributions of the various sensor signals.

15 Claims, 14 Drawing Sheets

(56) References Cited

U.S. PATENT DOCUMENTS

| | | |
|---|---|---|
| 7,248,968 B2 | 7/2007 | Reid |
| 7,469,594 B2 | 12/2008 | Jitsui et al. |
| 8,033,182 B2 | 10/2011 | Launay et al. |
| 2012/0083982 A1* | 4/2012 | Bonefas ............... G05D 1/0223 701/70 |
| 2012/0095651 A1* | 4/2012 | Anderson ............ G05D 1/0274 701/50 |
| 2012/0247919 A1 | 10/2012 | Soldner et al. |
| 2012/0310466 A1* | 12/2012 | Fairfield ................ G05D 1/024 701/28 |
| 2013/0245877 A1* | 9/2013 | Ferguson .................. B60R 1/00 701/23 |
| 2014/0172248 A1* | 6/2014 | Nickel .................... F16P 3/142 701/50 |
| 2014/0172263 A1* | 6/2014 | Agnew ..................... B60T 7/22 701/78 |
| 2014/0214255 A1* | 7/2014 | Dolgov ................ G05D 1/0248 701/23 |
| 2016/0221573 A1* | 8/2016 | Prokhorov ............ B60W 30/08 |

OTHER PUBLICATIONS http://techtransfer.gsfc.nasa.gov/downloads/featured_technologies/sensor_detector_technologies/19532_3d_capacifl_3_14_02.pdf 2 pages.
http://www.amazon.com/Theremin-Fully-Compliant-Electronic-Instrument/dp/B0013MSIA8. 5 pages. Retrieved Sep. 14, 2015.
http://en.wikipedia.org/wiki/Theremin. 11 pages. Retrieved Sep. 14, 2015.

* cited by examiner

HUMAN PRESENCE DETECTION ON A MOBILE MACHINE

FIELD OF THE DESCRIPTION

The present description relates to mobile machines. More specifically, the present description relates to detecting human beings in proximity to a mobile machine.

BACKGROUND

Mobile machines are currently in wide use. Some mobile machines generally operate on the roads, while others generally operate in off-road environments. Some current mobile machines include sensors that attempt to sense the presence of a human being in a location proximate the mobile machine. For instance, some on-highway pedestrian sensing is focused on detecting a standing or walking individual on a generally flat section of pavement, with few obscurants. Some current literature also discusses deploying human presence sensors on unmanned ground vehicles in the form of three dimensional LIDAR sensors (that illuminate a target with a laser and analyze the reflected light) and longwave infrared video sensors.

The discussion above is merely provided for general background information and is not intended to be used as an aid in determining the scope of the claimed subject matter.

SUMMARY

A mobile machine includes a set of human presence sensors that comprise one or more optical sensors, one or more thermal sensors, and an additional sensor that senses a characteristic of a human. The contribution of the various sensor values generated by the sensors is determined based on environmental conditions. A human presence metric, indicative of human presence, is generated from the contributions of the various sensor signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
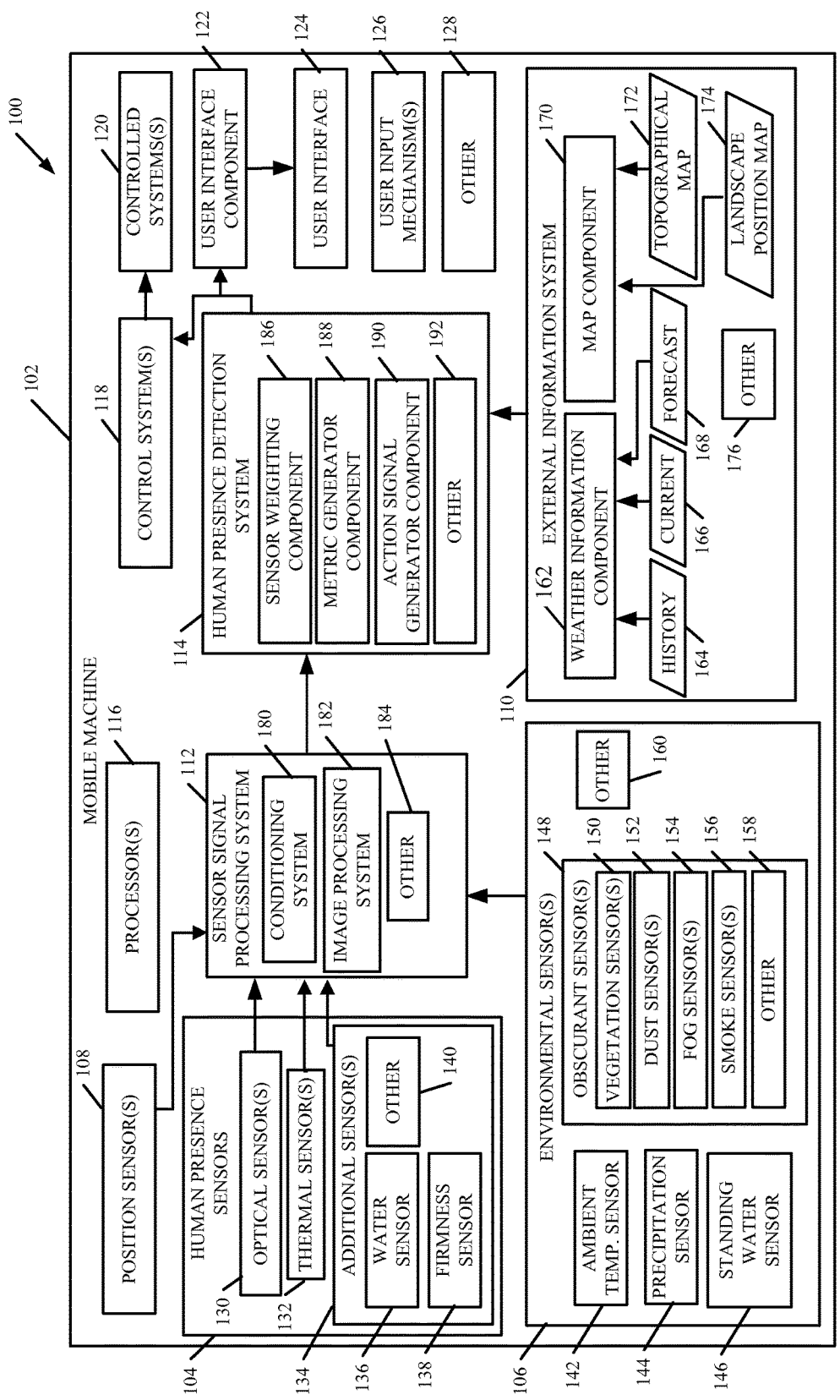
FIG. 1 is a block diagram of one example of a human presence sensing architecture on a mobile machine.

FIG. 1 is block diagram of one example of a human presence sensing architecture 100 on a mobile machine 102. It will be noted, as is described in greater detail in later figures, that the human presence sensing architecture can be deployed on a wide variety of different types of mobile machines. For instance, the mobile machines can be agricultural machines, unmanned machines (or autonomous vehicles), construction machines, turf or forestry machines, among others. In addition, portions of architecture 100 can be deployed on towed implements that are towed behind other mobile machines. For instance, they can be deployed on towed agricultural instruments that are towed behind a tractor. These, of course, are examples only.

In the example shown in FIG. 1, mobile machine 102 illustratively includes a set of human presence sensors 104, environmental sensors 106, a sensor signal processing system 112, and human presence detection system 114. Mobile machine 102 can also include one or more position sensors 108, an external information system 110, one or more processors 116, one or more control systems 118 that control a variety of different controlled systems 120, a user interface component 122 that generates user interfaces 124, one or more additional user input mechanisms 126, and it can include a wide variety of other items 128.

Human presence sensors 104 can include one or more optical sensors 130, one or more thermal sensors 132, and one or more additional sensors 134. The additional sensors 134 can include a water sensor (such as a capacitance sensor 136), a firmness sensor 138, or a variety of other sensors 140.

Environmental sensors 106 can include an ambient temperature sensor 142, a precipitation sensor 144, standing water sensor 146, and obscurant sensors 148 (which can include vegetation sensor 150, dust sensor 152, fog sensor 154, smoke sensor 156, or other obscurant sensors 158). Environmental sensors 106 can include a variety of other environmental sensors 160 as well.

External information system 110 illustratively obtains external information and provides it to human presence detection system 114. For instance, it can include weather information component 162 that obtains weather history information 164, current weather information 166, and weather forecast information 168. System 110 can also include map component 170 that obtains and provides a topographical map 172, or a landscape position map 174, or other map information, to system 114. External information system 110 can also include a wide variety of other components or sources of external information 176.

Sensor signal processing system 112 illustratively includes conditioning system 180 that performs signal conditioning (such as amplification, linearization, etc.) on the sensor signals that are received. System 112 can also include an image processing system 182 that performs image processing operations on image signals received from optical sensors 130. Signal processing system 112 can include a wide variety of other items 184 as well.

Human presence detection system 114 illustratively includes sensor weighting component 186, metric generator component 188, action signal generator component 190, and it can include a wide variety of other items 192. In one example, sensor weighting component 186 determines a contribution of each of the different human presence sensor signals from human presence sensors 104 to an overall metric that is indicative of whether a human is present in the proximity of mobile machine 102. Metric generator component 188 then generates the human presence metric, based upon the contributions of the various human presence sensors 104. Action signal generator component 190 then determines, based upon the human presence metric, whether an action signal needs to generated. In one example, action signal generator component 190 can include one or more thresholds that can be user configurable, or predefined. It compares the human presence metric to those thresholds to determine what type of action signal is to be generated, if any.

As an example, it can provide the action signal to a control system 118 to control the controlled systems 120. Controlled systems 120 can include, for instance, electrical systems, mechanical systems, hydraulic systems, pneumatic systems, air-over-hydraulic systems, or other systems. Those systems can perform a wide variety of different functions, such as controlling the travel speed and direction of mobile machine 102, controlling the position of various parts of mobile machine 102, controlling the performance of various functions within mobile machine 102, among a wide variety of other things. For instance, one of the controlled systems 120 may be the mobile machine propulsion or steering systems. In that case, the action signal provided to control system 118 may cause control system 118 to control the propulsion or steering system to stop, change speed of, or change course of, the mobile machine 102. In another example, the action signal is provided to user interface component 122 that uses it to generate a suitable user interface 124. The user interface may be a display, an audible output, a haptic output, etc. It may surface the human presence metric for user observation, or it may display it in other ways, such as in a warning message or another display. Further, the display may indicate not only the human presence metric, but it may also indicate an approximate location of a human, if a human is detected.

Where mobile machine 102 is operated by an operator, the operator can control mobile machine 102 through user input mechanisms 126. Those mechanisms can include, for instance, mechanisms that are displayed on a user interface display. Therefore, they can be touch sensitive display elements, icons, links, etc. User input mechanisms 126 can also include a wide variety of other user input mechanisms that can be used to control machine 102. These can include such things as switches, levers, push buttons, keypads, pedals, steering wheels, joysticks, etc.

Figure 2:
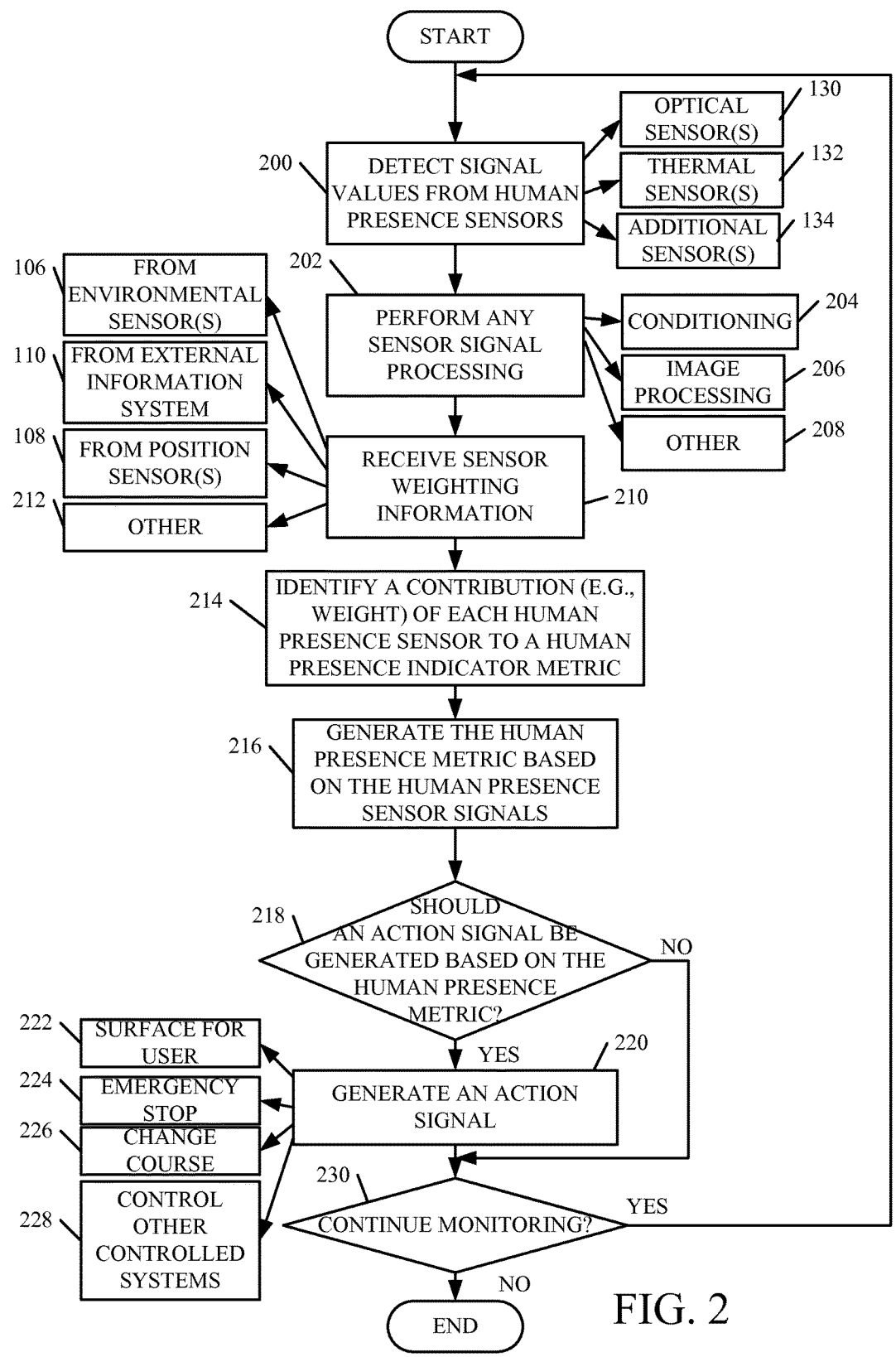
FIG. 2 is a flow diagram illustrating one example of the operation of a human presence detection system.

FIG. 2 is a flow diagram illustrating one example of the operation of human presence detection system 114. As mobile machine 102 is operating, human presence sensors 104 (and the other sensors on mobile machine 102) are illustratively generating sensor signals and providing them to sensor signal processing system 112. Detecting the signal values from the human presence sensors 104 is indicated by block 200 in FIG. 2. As briefly described above with respect to FIG. 1, sensors 104 can include optical sensors 130, thermal sensors 132 and one or more additional sensors 134. Optical sensors 130 can be a wide variety of different sensors. For instance, they can include a camera, a stereo camera, a structured light sensor, a LIDAR sensor, among other things.

Thermal sensors 132 can also be comprised of a wide variety of different types of sensors. For example, a thermal sensor 132 can be a long-wave infrared sensor array which can report temperatures for each element of the array, corresponding to a portion of a region of interest (or field of regard) that is proximate mobile machine 102. Other thermal sensors can be used as well.

As mentioned above, additional sensors 134 can include water sensors 136, firmness sensors 138 and other sensors 140. Water sensor 136 may be a capacitive sensor that senses a permittivity on a worksite (e.g., in the region of interest of a field). Because water dominates the permittivity of agricultural, construction, turf and forestry worksites, the sensed permittivity may be further indicative of human presence. This is because the human body is made up of approximately 65% water. Dry soil is made of basically 0% water and green crops are made up of approximately 30% water. Water saturated soil is approximately the same as a green crop, and standing water is, of course, 100% water. Thus, the capacitive sensor may provide a signal that is useful in determining human presence.

Firmness sensor 138 may, for instance, include a set of mechanical fingers that protrude forward of mobile machine 102 in the direction of travel of machine 102. They can be provided with spring resistance that is measured to give an indication of the firmness of an object that is deflecting the fingers against the spring resistance.

When the sensor signals are received, then sensor signal processing system 112 performs any desired signal processing on those signals. This is indicated by block 202 in FIG. 2. For instance, conditioning system 180 can perform signal conditioning 204. Image processing system 182 can perform image processing 206. The signal processing can also include a wide variety of other processing 208.

It may be that, under certain circumstances, some of the human presence sensors 104 work better than others. Therefore, human presence detection system 114 not only receives the conditioned signals from system 112, but it can also receive additional weighting information to determine how much each of the sensor signals should contribute to an overall human presence metric. Receiving the sensor weighting information is indicated by block 210 in FIG. 2. This information can be received from environmental sensors 106, from external information system 110, from position sensor 108, or from other sources 212.

Once the sensor weighting information is received, then sensor weighting component 186 identifies a contribution (e.g., a weight) that will be assigned to each of the human presence sensor signals in calculating a human presence indication metric that is indicative of whether a human is present. This is indicated by block 214 in FIG. 2.

As an example, image processing system 182 may process the image signal from optical sensors 130 to determine whether a human is present in the region of interest. Image processing system 182 may, for instance, assign values indicative of whether the image being processed detects an object in the field of view of the sensor, the size and orientation of the object, the color deviation from that of the worksite (e.g., the field) surface, etc. It may also perform structural segmentation in an attempt to identify certain parts of the image. For instance, if the image is 1.7 meters perpendicular to the ground, and is composed of shapes that correspond to legs (which may be blue in color), a trunk (which may be red in color), arms (which may be red in color) and a head (which may be skin colored), and if it has a face, then the image may be assigned a near maximum evidence value or probability contribution. This may be, for instance, if the sensor weighting component 186 identifies the blue shapes as being from blue jeans and the red shapes as being from a red shirt. This is but one example.

In some situations, however, the image signal, alone, may be inadequate in generating a human presence metric value with high confidence. For instance, a person may be lying on the ground at a worksite sleeping, or unconscious. The user may be wearing camouflage colored clothing or there may be obscurants in the environment, making it more difficult to detect a human in the visible light wavelength, using optical sensors 130. Sensor weighting component 186 thus considers information from environmental sensors 106 in determining how confident system 114 can be in the signal from optical sensors 130.

By way of example, obscurant sensors 148 can include the vegetation sensor(s) 150, dust sensor(s) 152, fog sensor(s) 154, smoke sensor(s) 156, or a wide variety of other obscurant sensor(s) 158. When obscurant sensors 148 indicate a high likelihood that obscurants are present, then sensor weighting component 186 can lower the weight or contribution attributed to the sensor signal from optical sensors 130, and increase the weight or contribution attributed to the sensor signals from the other sensors.

For instance, where obscurants are present, then thermal sensor 132 may be relied on more heavily. If it provides absolute temperatures near body temperature, this may be an indication that a human is present. However, certain conditions may also exist in which the sensor signal from thermal sensors 132 may be less effective in indicating the presence of a human being. For instance, when ambient temperatures are near 98.6, or when clothing provides insulation such that the surface of the clothing is nearly the same temperature as the environment, then thermal sensors 132 may be less effective in indicating that a human is present. Thus, sensor weighting component 186 can receive a signal from ambient temperature sensor 142 in environmental sensors 106, in order to take this into consideration.

In either of the cases mentioned above, signals from additional sensors 134 can be used to generate the human presence metric as well. For example, even if there are obscurants present, and even if the ambient temperature is near body temperature for a human being, then a capacitive sensor (which can be used to implement water sensor 136) can be used also. The capacitive sensor may be less effective in detecting human presence when the amount of standing water at a worksite would cause the sensor to falsely support human presence. Thus, it may be useful for sensor weighting component 186 to know when a region contains standing water. In that case, standing water sensor 146 can generate a signal indicative of this. This can be a probe that rides along the ground ahead of machine 102, it can be a combination of sensors, etc. Also, or alternatively, the presence of standing water may be inferred with knowledge of the recent rainfall history at the worksite in combination with a topographical map or a landscape position map, and a current position of machine 102. Thus, sensor weighting component 186 can receive external information in the form of weather history information 164, current weather conditions 166 and weather forecast information 168. It can also receive topographical map information 172 and/or landscape position map 174. It can further receive information from precipitation sensor 144 that is indicative of whether precipitation is currently occurring. Based on that information, and based on a current position of mobile machine 102 derived from position sensor 108, sensor weighting component 186 can infer whether standing water is currently being sensed at the worksite, proximate a current position of mobile machine 102. If so, then the weight or contribution attributed to water sensor 136 in the human presence metric calculation can be reduced. In such a case, additional sensors, such as firmness sensor 138 or other sensors 140, can also be considered.

Once a contribution for each of the human presence sensors 104 has been identified, then metric generator component 188 can generate (or calculate) the human presence metric based upon the human presence sensor signals, and the corresponding contributions or weights that have been attributed to them. This is indicated by block 216 in FIG. 2.

A more detailed example of how the contribution for each of the human presence sensors is identified, and how the human presence metric is generated, is described below with respect to FIGS. 3A and 3B.

Once the human presence metric has been generated, then action signal generator component 190 determines whether an action signal should be generated based upon the human presence metric. This is indicated by block 218 in FIG. 2. In one example, for instance, action signal generator component 190 is provided with one or more thresholds that divide the human presence measurement range into a plurality of different sections. The action signal generator component 190 can, in one example, generate a different kind of action signal, in order to take a different action, based upon the particular section that the human presence metric falls into. Generating the action signal is indicated by block 220 in FIG. 2.

If it falls into one section that corresponds to a relatively high confidence level that no human is present, then it may be that component 190 generates no action signal (or no actions are taken). In another example, it may be that the human presence metric is always displayed to the user or otherwise surfaced for the user, regardless of which section it falls into. Other actions can be taken as well. As mentioned, the action signal can be provided to user interface component 122 to generate a user interface 124 that surfaces the human presence metric (or some indication of it) for the user. This is indicated by block 222. In another example, control system 118 may control the propulsion system of mobile machine 102. In that case, if the human presence metric indicates that a human is present and is in close proximity to machine 102, then action signal generator component 190 can generate an action signal and provide it to control system 118 to slow machine 102 or conduct an emergency stop of mobile machine 102. This is indicated by block 224.

In another example, control system 118 controls the directional (e.g., steering) functions of machine 102. In that case, action signal generator component 190 can generate an action signal that either changes the course of mobile machine 102 or that otherwise guides the direction of mobile machine 102 to avoid undesired contact with a human. This is indicated by block 226 in FIG. 2.

In another example, control system 118 may control a position of ground engaging portions of mobile machine 102 (or attachments or towed implements). They can be moved between a lowered, ground engaging, position or a raised position. In that case, action signal generator component 190 can generate an action signal and provide it to control system 118 to change the position of the ground engaging implements, based upon the human presence metric. It can control other controlled system 120 as well, and this is indicated by block 228 in FIG. 2.

Human presence detection system 114 can, in one example, continuously monitor the various sensor signals to detect human presence. It can also illustratively receive position information from position sensor 108 to determine whether mobile machine 102 is moving toward a detected human presence, away from it, or whether the detected human presence is moving away from the travel path of mobile machine 102. It can also detect the relative positions and movements of mobile machine 102 and any detected human presence in other ways as well. All of these can be considered by action signal generator component 190 in generating an appropriate action signal. At some point, the monitoring operation will end. For instance, the operator may shut off mobile machine 102, or otherwise disengages the human presence detection system 114. This is indicated by block 230 in FIG. 2.

Figure 3A:
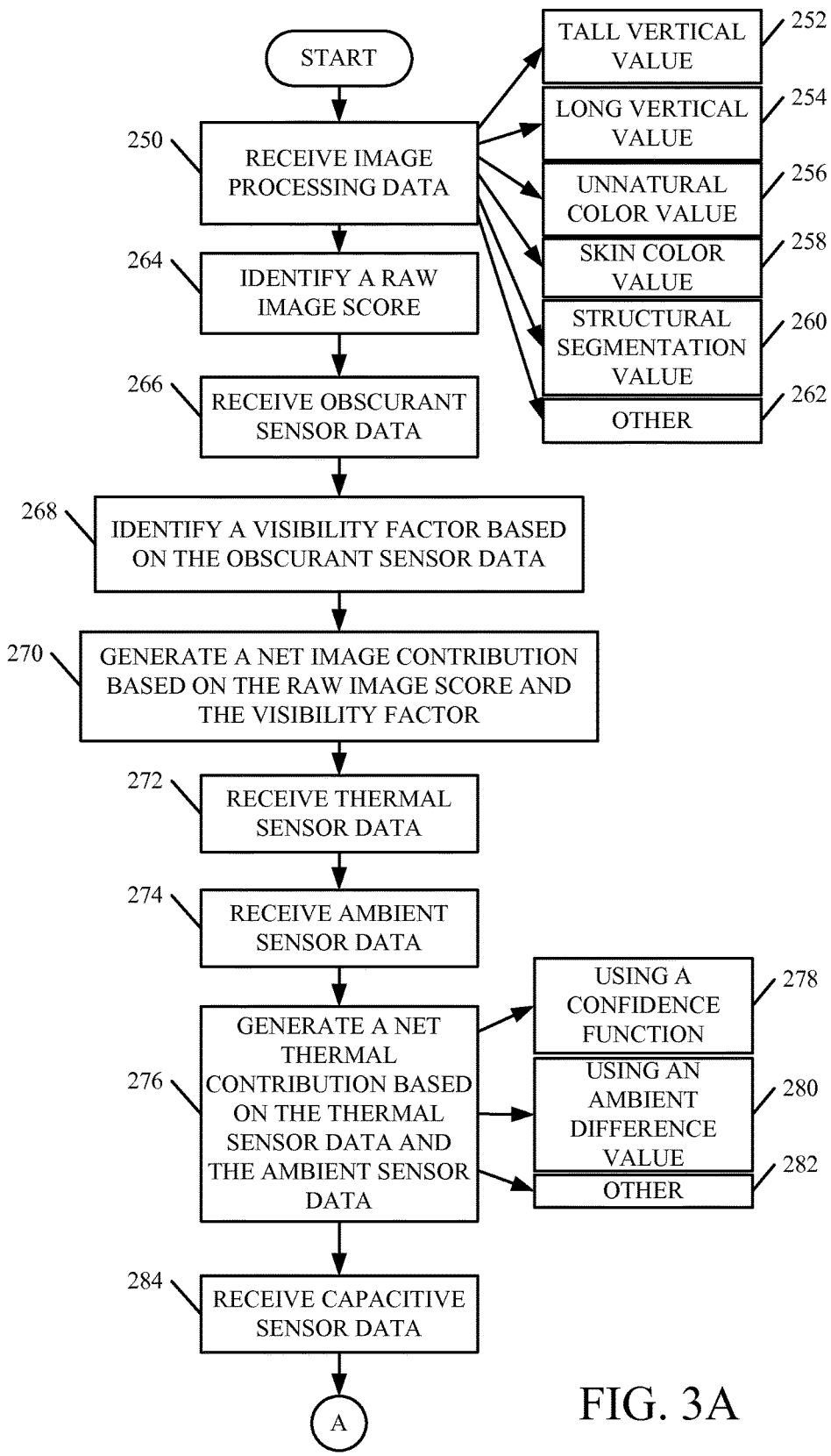
FIGS. 3A and 3B (collectively referred to herein as FIG. 3) illustrate a flow diagram showing one example of the operation of the human presence detection system in determining a contribution of each of a plurality of different human presence sensors to a human presence metric.
Figure 3B:
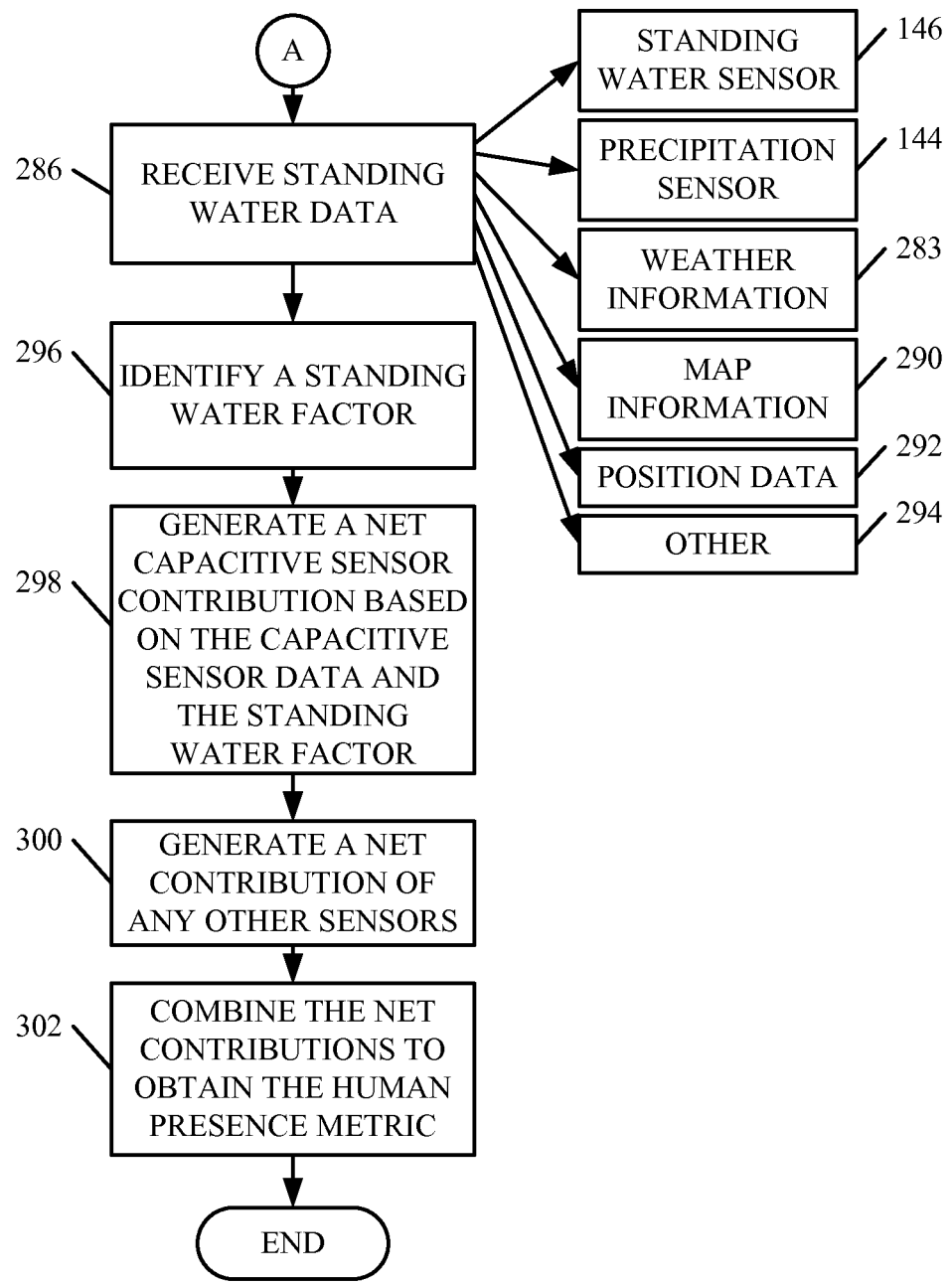

FIGS. 3A and 3B (collectively referred to herein as FIG. 3) show a flow diagram illustrating one example of how the contribution of each human presence sensor can be identified (or calculated), and how they can be combined in order to determine the human presence metric value. In the example described with respect to FIG. 3, the sensor used from additional sensors 134 is a capacitive sensor. It will be appreciated that this is only one example.

Sensor weighting component 186 first receives the image processing data from image processing system 182. This is indicated by block 250 in FIG. 3. Where the image captured by optical sensor 130 is a three dimensional image, it may be processed to identify a human-sized volume relative to an average, typical or median soil surface or relative to a crop canopy, for instance. If a person is standing, they can be recognized as a "tall vertical" image extending from the soil surface approximately 3-7 feet upwards and approximately 1-2 feet wide. If a person is prone on the ground, they can be detected as a "long vertical" image extending approximately 1-2 feet above the soil surface and approximately 3-6 feet in length. Recognition of "tall vertical" and "long vertical" images are indicated by blocks 252 and 254 in FIG. 3.

Imaging processing system 182 can also analyze the images for unnatural colors (that is, colors outside of that for normal soil, vegetation, and residue, or other normal colors found at a worksite). Natural colors for a typical soil can range from black to grey to red to white, while typical vegetation colors range from green to brown. Residue colors fall in the range of soil and vegetation, depending on a state of dry down and decay of the residue. Thus, for instance, a bright red shirt, blue jeans, orange or yellow safety vest, etc. would all fall outside of the normal color range for a field. Identifying unnatural color values is indicated by block 256 in FIG. 3. In one example, image processing system 182 detects skin color by performing color analysis on the image. Detecting skin color is indicated by block 258 in FIG. 3.

Image processing system 182 can also perform structural segmentation on the image. Structural segmentation can be used to identify segments of the detected image structure that correspond to body parts (such as a head, abdomen, legs, arms, etc.). Performing structural segmentation is indicated by block 260 in FIG. 3. Other image processing 262 can be performed as well.

Based upon the received image and the image processing performed, sensor weighting component 186 illustratively generates a raw image score from the information received from optical sensors 130 (and processed by image processing system 182). Generating the raw image score is indicated by block 264 in FIG. 3.

Sensor weighting component 186 then obtains information to determine how much confidence it can place on the raw image score. For instance, component 186 can detect the inputs from the obscurant sensors 148 to determine whether the present worksite has obscurants which may obscure the image captured by optical sensors 130, rendering them less accurate in detecting a human presence. Receiving the obscurant sensor data is indicated by block 266 in FIG. 3.

Sensor weighting component 186 then determines or calculates a contribution to the human presence metric that will be attributed to the raw image score, based upon the presence of obscurants in the environment being sensed. This can be done in a number of different ways. For instance, component 186 can generate or otherwise identify a visibility factor based upon the obscurant sensor data. This is indicated by block 268. By way of example, if the obscurant sensors 148 indicate a high level of obscurants in the environment, then the visibility factor may be a relatively low value. If, on the other hand, sensors 148 indicate a relatively low level of obscurants in the environment, then the visibility factor may be a relatively high value.

Component 186 then generates a net image contribution to the human presence metric based upon the raw image score and the visibility factor. This is indicated by block 270. In one example, component 186 weights the raw image score by the visibility factor. Therefore, if the visibility factor is high (indicating relatively few obscurants) then the raw image score will be weighted relatively high in contributing to the human presence metric. On the other hand, if the visibility factor is low (indicating that here is a relatively high level of obscurants) then the contribution of the raw image score to the human presence metric will be relatively low.

Sensor weighting component 186 also receives the thermal sensor data generated from thermal sensors 132. In one example, component 186 also generates an ambient temperature factor from the ambient temperature sensed by sensor 142. The ambient temperature factor can be calculated to represent a loss of confidence in the ability of the thermal sensor data to predict the presence of a human being, because the ambient temperature from the current weather is near human body temperature. Receiving the thermal sensor data is indicated by block 272 and receiving the ambient temperature sensor data is indicated by block 274.

Component 186 uses the ambient temperature factor to generate a net thermal contribution to the human presence metric based on the thermal sensor data and the ambient sensor data. This is indicated by block 276. It can do this using a confidence function, as indicated by block 278. For instance, assume that $T_a$ is the ambient temperature sensed by ambient temperature sensor 142. Assume further that $T_i$ is the temperature from a single longwave infrared (LWIR) thermal sensor element, or a composite of a plurality of LWIR elements. It will be noted that in the latter case, the single value for $T_i$ may be an average, median, maximum or some other function of the plurality of temperature values. Component 186 can then generate the ambient temperature factor as follows:

$$IF(88.6F < Ta < 108.6F) THEN /*\text{concern if ambient is} +/-10 \text{ from body temp}$$

$$ATF = (|Ta - 98.6F|^2)/100 /*\text{example confidence function} \qquad \text{Eq. 1}$$

$$ELSE$$

$$ATF = 1$$

$$ENDIF$$

A contribution of the thermal sensor data to the human presence metric may then be calculated as follows:

$$(1 - (|Ti - 98.6F|)/160) * ATF \qquad \text{Eq. 2}$$

In yet another example, the contribution to the human presence metric attributed to the thermal sensor data is not based on the absolute temperature from thermal sensor 132, but is instead based on a temperature difference between the temperature in a region of a thermal image and a second region, or the ambient temperature. As an example, in cooler weather, when no skin is exposed and the surface of clothing has a temperature somewhere between ambient temperature and body temperature, the temperature differential between the temperature of the thermal image and ambient temperature may be used. In such an example, a contribution attributed to the thermal sensor data, for generating the human presence metric, may be calculated as follows:

$$|Ti-Ta|/50 \qquad \text{Eq. 3}$$

Using an ambient difference value is indicated by block 280 in FIG. 3. It will be noted that the net thermal contribution can be generated in other ways as well, and this is indicated by block 282.

In the example described with respect to FIG. 3, sensor weighting component 186 then receives capacitive sensor data from a capacitive sensor (e.g., a water sensor 136). This is indicated by block 284 in FIG. 3. It also illustratively generates a standing water factor from standing water data that it can receive from standing water sensor 146, precipitation sensor 144, or that it can infer from external information received from system 110, or otherwise. Receiving the standing water data is indicated by block 286 in FIG. 3. Receiving weather information from component 162 is indicated by block 283. Receiving map information from map component 170 is indicated by block 290, and receiving current position data from position sensor 108 is indicated by block 292. Of course, standing water data can be received in other ways as well, and this is indicated by block 294.

Once the standing water data is received, component 186 illustratively generates or otherwise identifies a standing water factor that can be used to estimate whether the capacitive sensor data is questionable due to the presence of standing water. As one example, assume that W is the measured percentage of water is a volume of interest based on data from a calibrated capacitive sensor. Assume also that the permittivity is only impacted by soil, soil moisture, vegetative matter, body water (of a human body) and standing water. A contribution to the human presence metric of the capacitive sensor value may be obtained as follows:

$$(100-|65-W|)*SWF \qquad \text{Eq. 4}$$

where SWF is the standing water factor, where a value of 1 indicates dry conditions and a value of 0 indicates the presence of standing water or other conditions which render the confidence in the ability of the capacitive sensor to identify a human presence as being very low. Identifying the standing water factor is indicated by block 296 in FIG. 3. Generating the net capacitive sensor contribution to the human presence metric, based on the capacitive sensor data and the standing water factor, is indicated by block 298 in FIG. 3.

Where any additional sensors 134 are used, sensor weighting component 186 then generates a net contribution of any of those sensors as well. This is indicated by block 300. It then combines the net contributions of all of the sensors to obtain the human presence metric. This is indicated by block 302. In one example, the net contributions are combined by adding them. In another example, they can be combined in other ways as well.

This is but one example of how sensor weighting component 186 and metric generator component 188 may operate. There are a variety of other ways that this can work as well. For instance, those components can be implemented in fuzzy logic, neural networks, rule-based systems, Bayesian probability systems, Dempster-Shafer theory mechanisms, or other mechanisms.

It will also be noted that, while FIG. 3 describes assigning the contribution of each sensor, in order, other approaches could be used as well. For instance, the sensor signals from a plurality of different sensors could all be processed before assigning a contribution of any of those sensors to the human presence metric. As an example, the combination of an area of temperature 98.6 on the highest part of a "tall vertical" image with skin color (e.g., a face) may be given a higher contribution than the sum of the three individual contributions from the three individual sensors. This is only one example of how the sensor signals may be evaluated before assigning a contribution.

FIGS. 4-9 show various examples of how architecture 100 may be implemented on a variety of different mobile machines. All of these figures illustrate a tillage implement 350 towed behind a tractor 352. However, architecture 100 can be deployed on a wide variety of other off-road equipment such as, for instance, a self-propelled sprayer, a tractor pulling a sprayer, a tractor pulling a planter or seeder, a combine, construction equipment, turf and forestry equipment, etc.

It will also be noted that the communication among the various components of architecture 100, in the various implementations, can be performed over a wired connection (such as a CAN or Ethernet connection) or over a wireless connection (such as a WiFi connection, an LTE connection, etc.). Also, the various sensors can be local to, or remote from the mobile machine. By way of example, ambient temperature sensor 142 may be a temperature sensor in the field of interest, which communicates the ambient temperature to architecture 100 over one of a variety of different communication mechanisms. Similarly, external information system 110 can be external to the mobile machine and communicate the information to the mobile machine over a wireless network, for instance. All of these architectures are contemplated herein.

Figure 4:
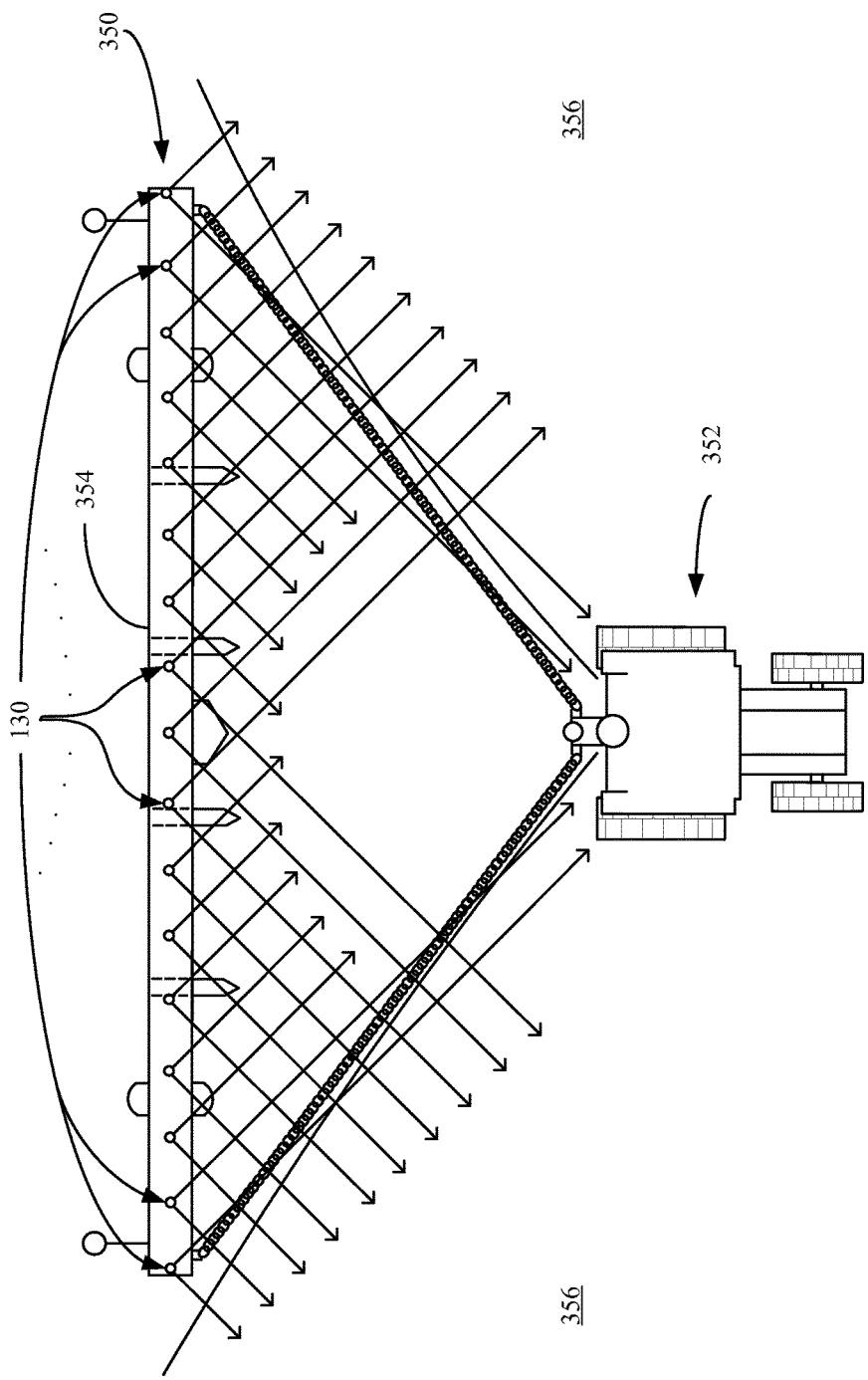
FIGS. 4-9 show various examples of implementations of the human presence sensing architecture shown in FIG. 1.

FIG. 4 shows an example in which a number of different optical sensors 130 are mounted across an implement toolbar 354. The optical sensors can be three dimensional cameras, so that the arrows emanating from each camera depict the edges of the field of view for that particular camera. Regions that lie in two or more camera fields of view are candidates for stereo imaging, such as the fields of interest (or fields of regard) shown generally at 356 in FIG. 4.

Figure 5:
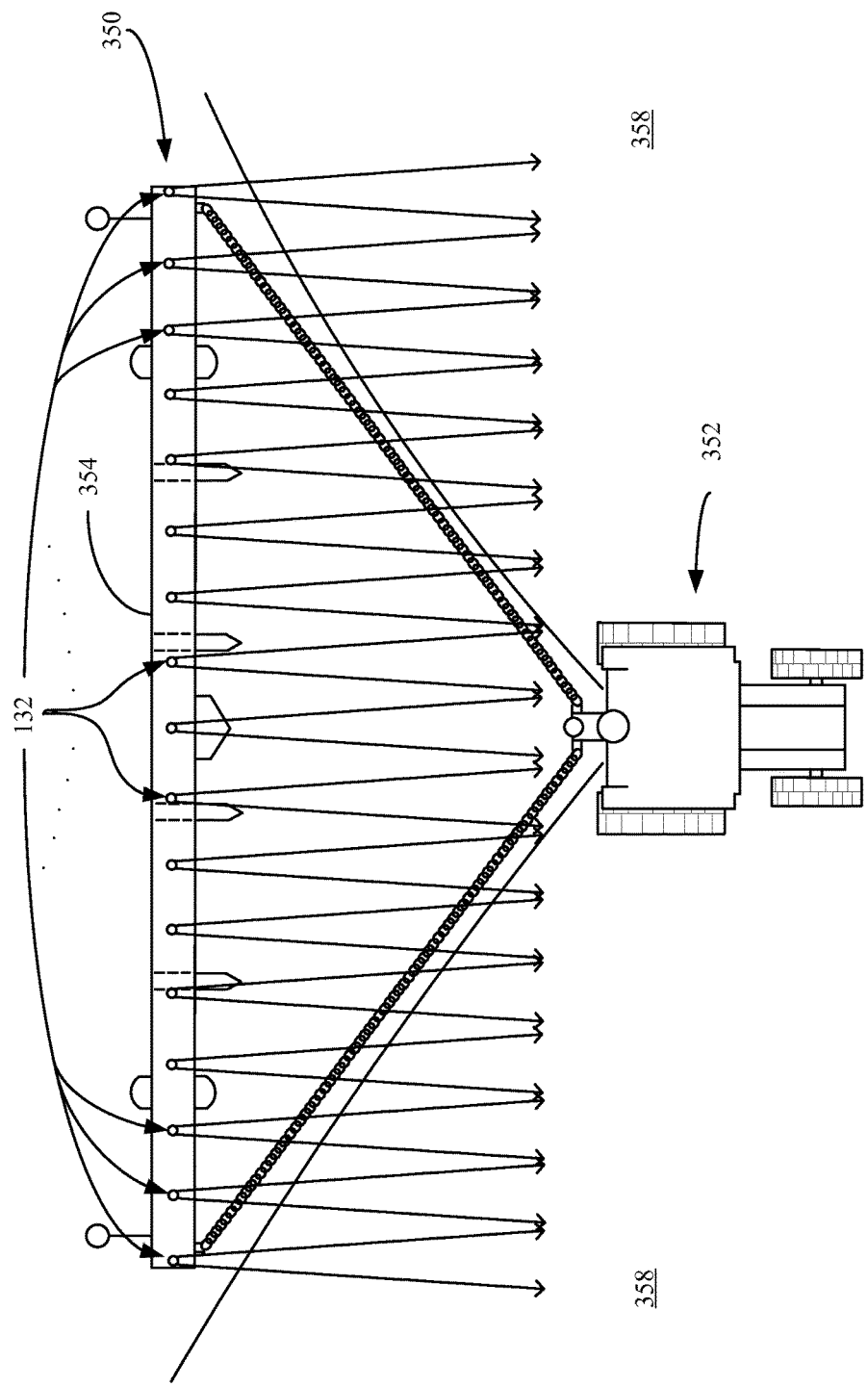

FIG. 5 shows an example in which a number of thermal sensors 132 are mounted across the implement toolbar 354. Thermal sensors 132 may share a housing and other components with optical sensors 130 (shown in FIG. 4) or they may be housed in different components. The lines with arrows emanating from each sensor 132 depict the edges of the field of view for that particular sensor. Each thermal sensor 132 may comprise a single transducer or may be a one dimensional, or two dimensional array of transducers. Thermal sensors 132 can be placed (and may have lenses) to enable full coverage of the fields of interest (or fields of regard) 358 illustrated in FIG. 5. The fields of regard 358 are illustratively in front of the implement toolbar 354 or some other area relative to implement 350.

Figure 6:
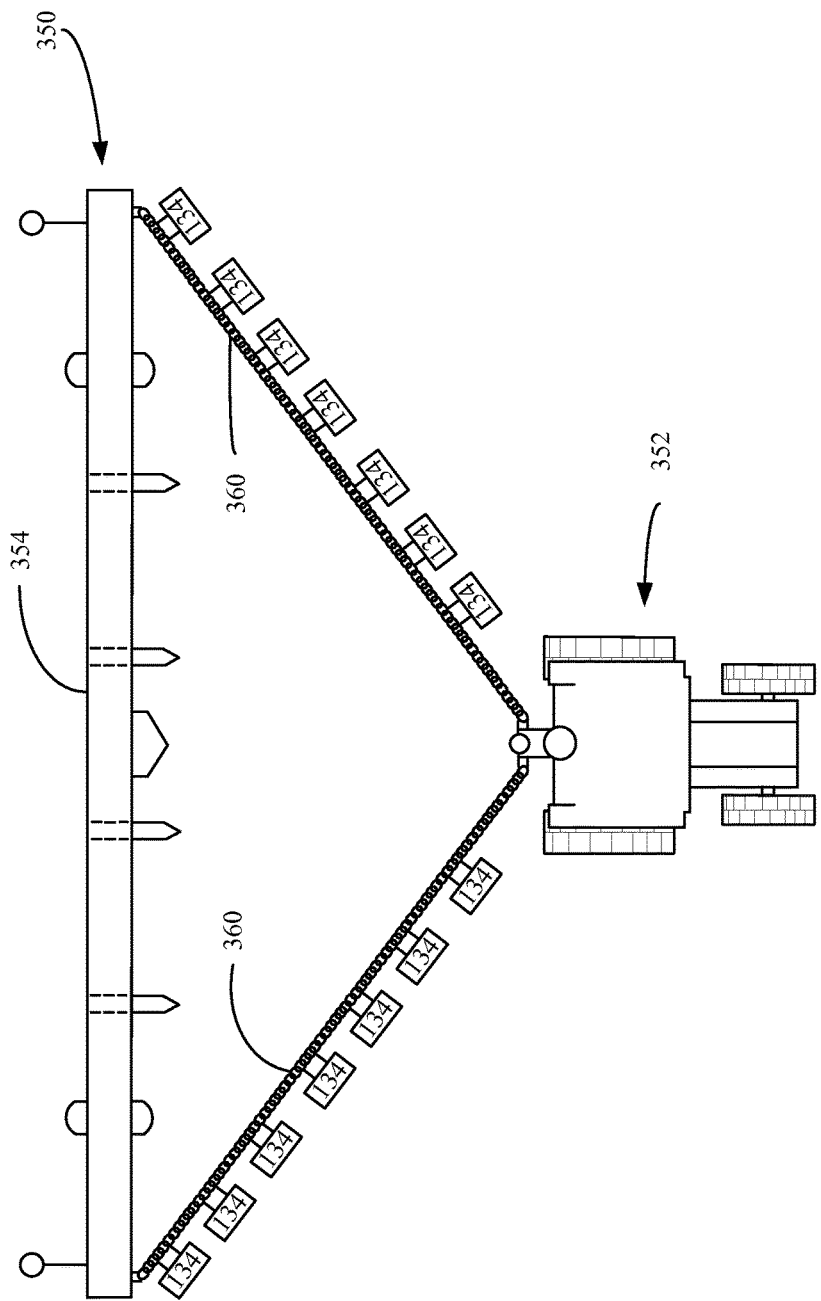

FIG. 6 shows an example implementation in which a number of additional sensors 134 (which can, for example, be capacitive sensors 136, firmness sensors 138, or other sensors 140) are mounted across an implement draw bar 360. They are mounted so that the sensors can detect a human at a given vehicle speed in time for the vehicle to fully respond to an action signal that is generated based on that detection. That is, for a fixed response time, a capacitive sensor field of regard is far enough from the implement to allow the mobile machine to react. In general, for a fixed response time, the faster the vehicle travels, the further the sensors look ahead.

Figure 7:
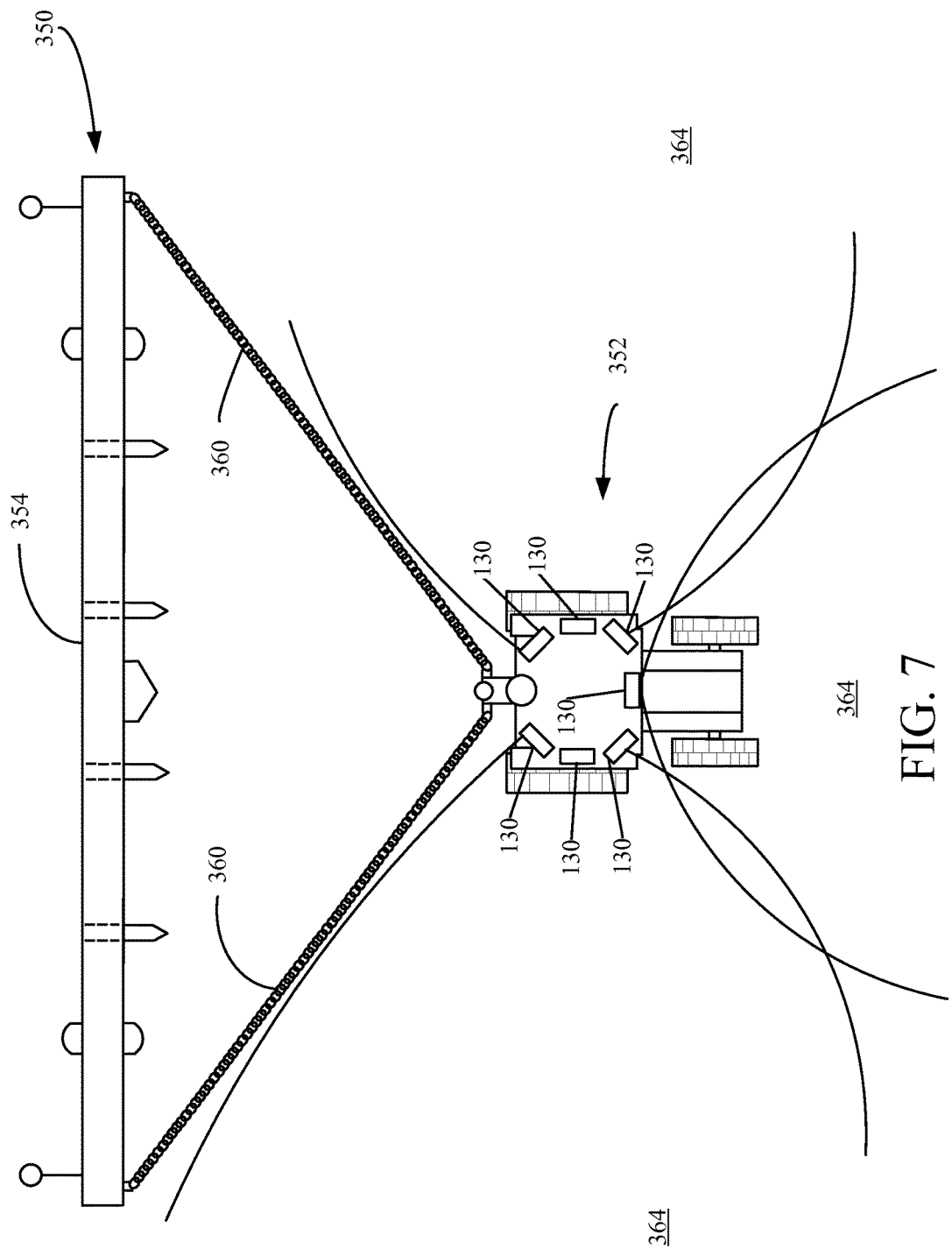

FIG. 7 shows an example implementation in which a set of optical sensors 130 are mounted on the operator compartment on the towing vehicle (e.g., tractor) 352, rather than on the towed implement 350. The sensors can be mounted so that the fields of regard cover regions in front of the towing vehicle 352 as well as in front of the towed implement 350. In still other implementations, the sensor locations may be split between the towing vehicle 352 and the towed machine 350.

Figure 8:
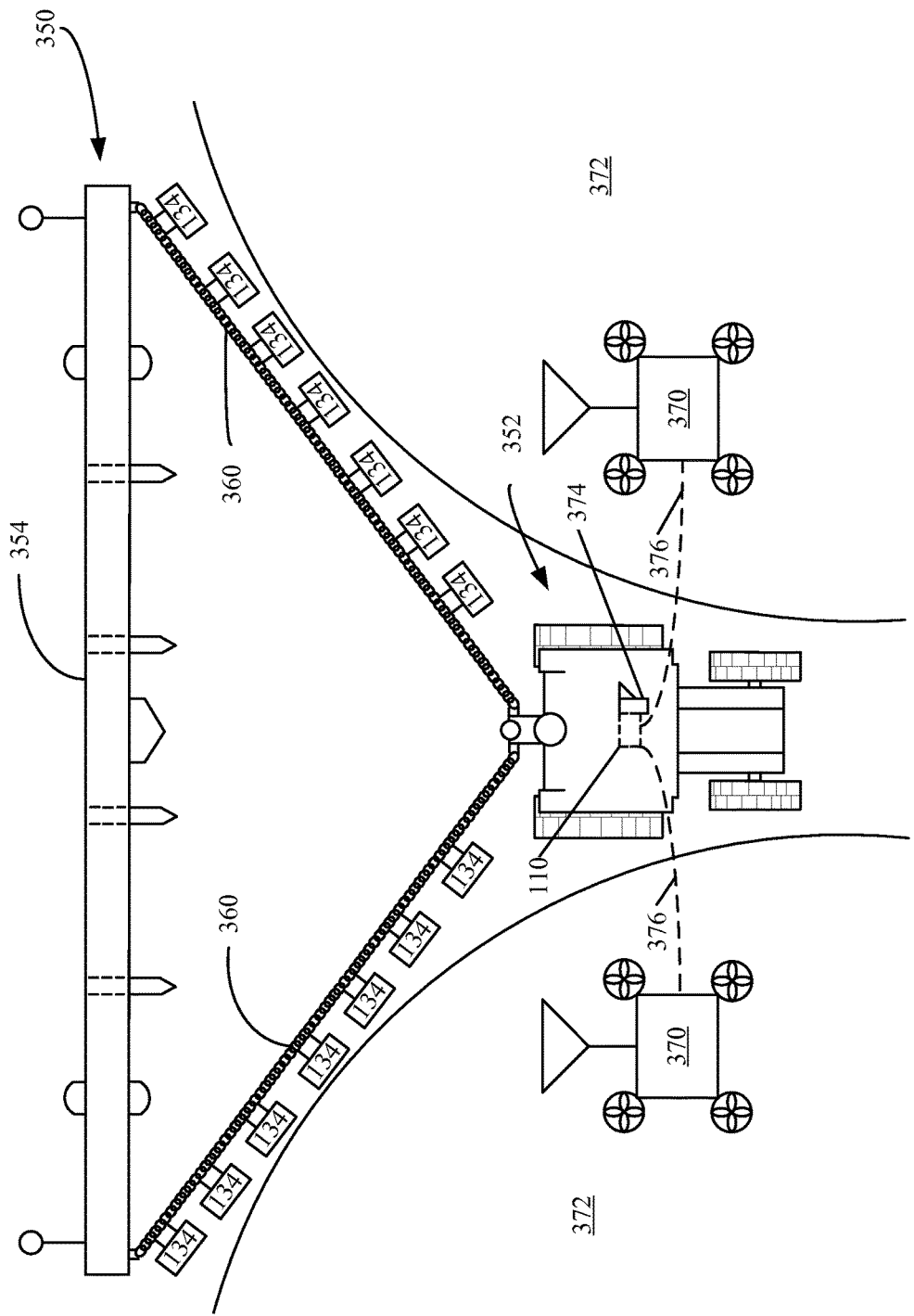

FIG. 8 shows an example implementation in which an optical sensor 130 or a thermal sensor 132 are mounted on one or more unmanned vehicles 370. Vehicles 370 can be, for example, quad-copters, octo-copters, fixed wing aircraft, unmanned ground vehicles, etc. The optical sensors or thermal sensors are configured to monitor fields of regard 372. Capacitive sensors (or other additional sensors 134) can also be mounted to the tow bar 360 for the towed implement 350. They could be mounted on the unmanned vehicles 370 as well. Processor 116, or other items in architecture 100, can include a communication component 374 and can communicate over a link 376 (which can be either a wireless link or a tethered connection) to vehicles 370. If the connection is a tethered connection, it can also provide power to vehicles 370. By providing unmanned aerial vehicles, this may reduce the need to mount sensors to either the towed implement 350 or towing vehicle 352. It may also reduce the impact of obscurants because there may be a relatively short optical path through obscurants to the ground, from the elevated position of vehicles 370.

Figure 9:
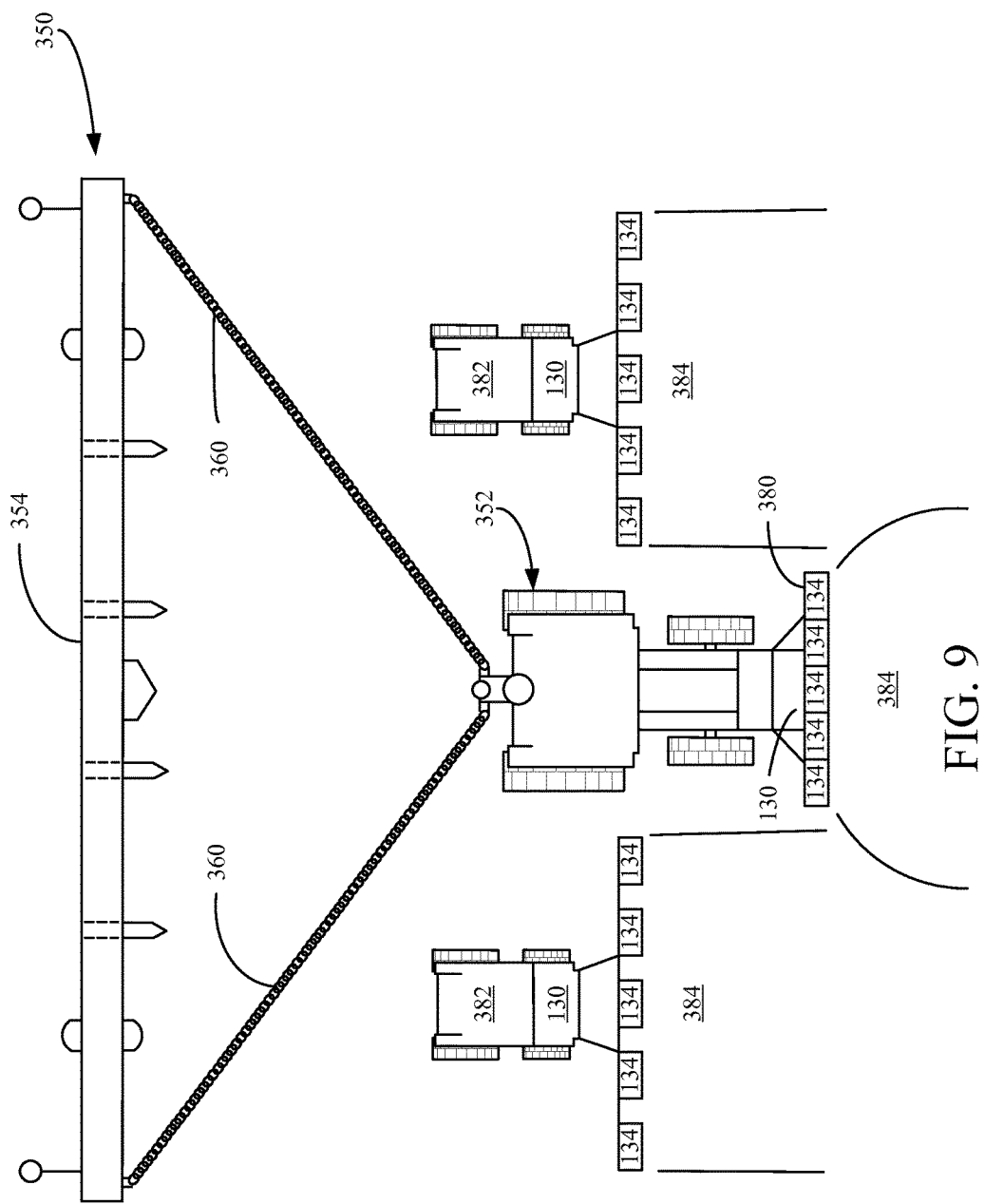

FIG. 9 shows yet another example implementation in which optical sensors 130 and additional sensors 134 (e.g., capacitive sensors) are mounted on a front bar 380 of towing vehicle 352 and on unmanned ground vehicles 382. They can be positioned to monitor fields of regard 384. Again, they can communicate with various components of architecture 100 through a wireless or wired communication link.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores may also be used. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
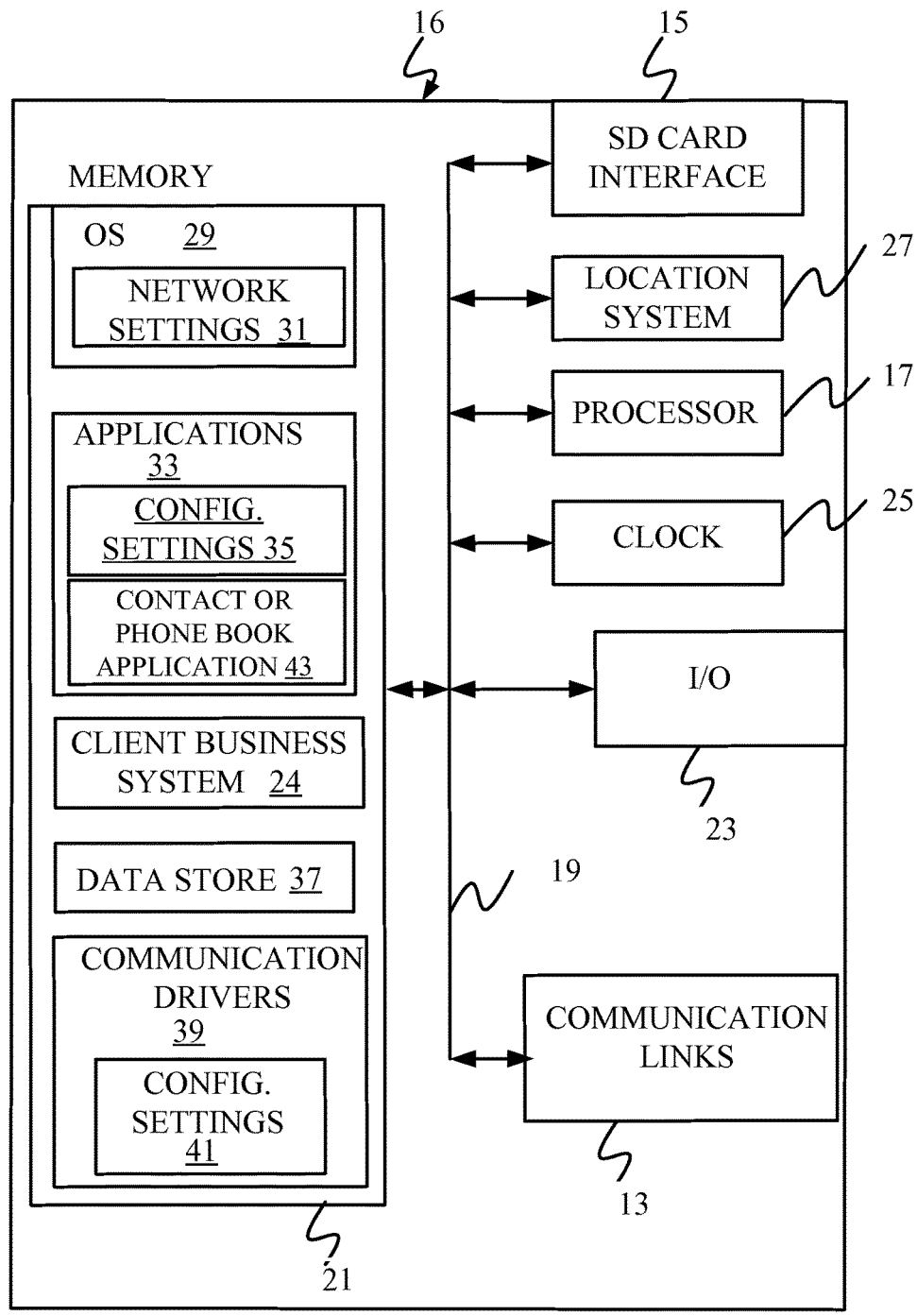
FIGS. 10-12 show examples of mobile devices that can be used to generate user interfaces in a mobile machine.
Figure 11:
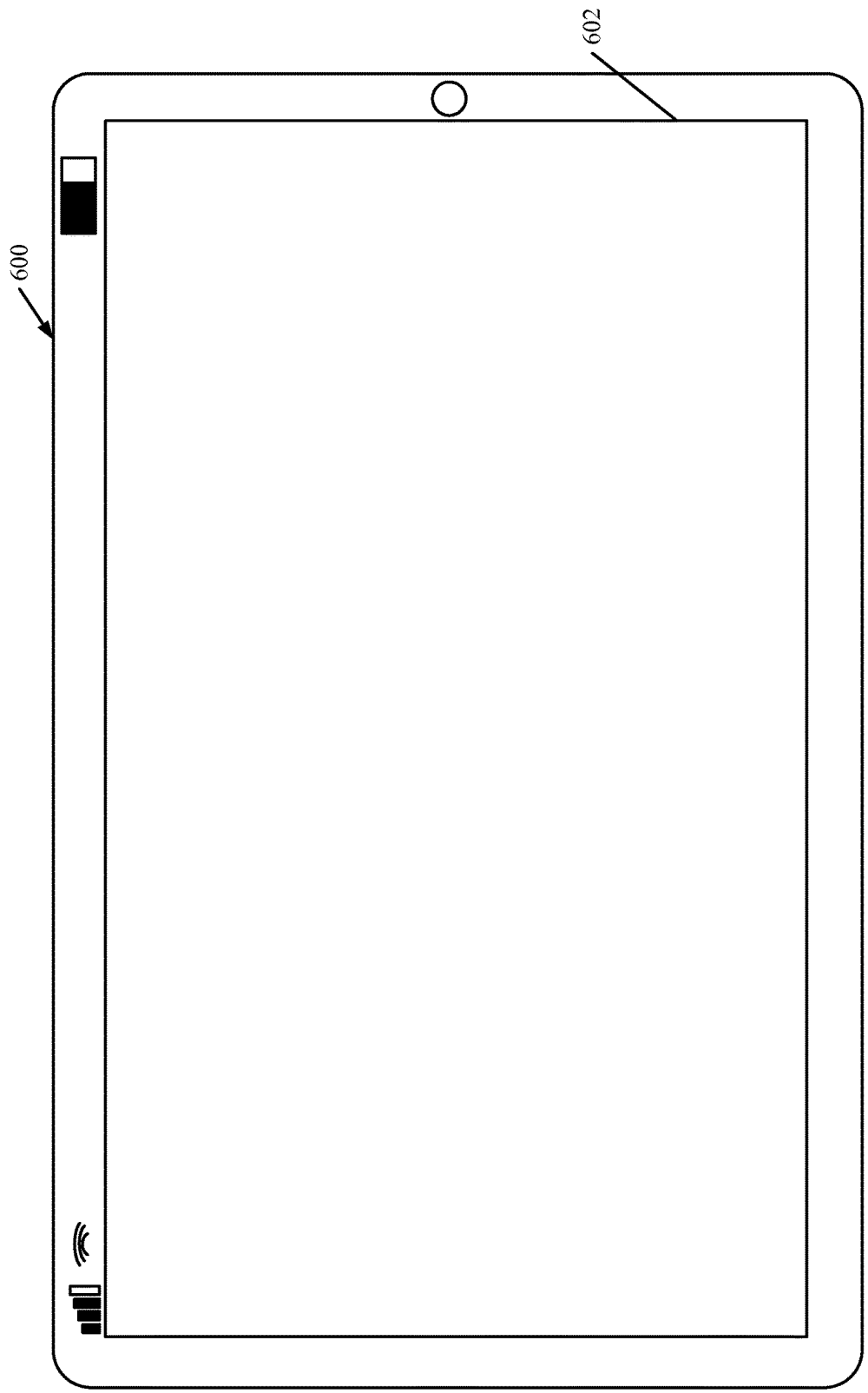
Figure 12:
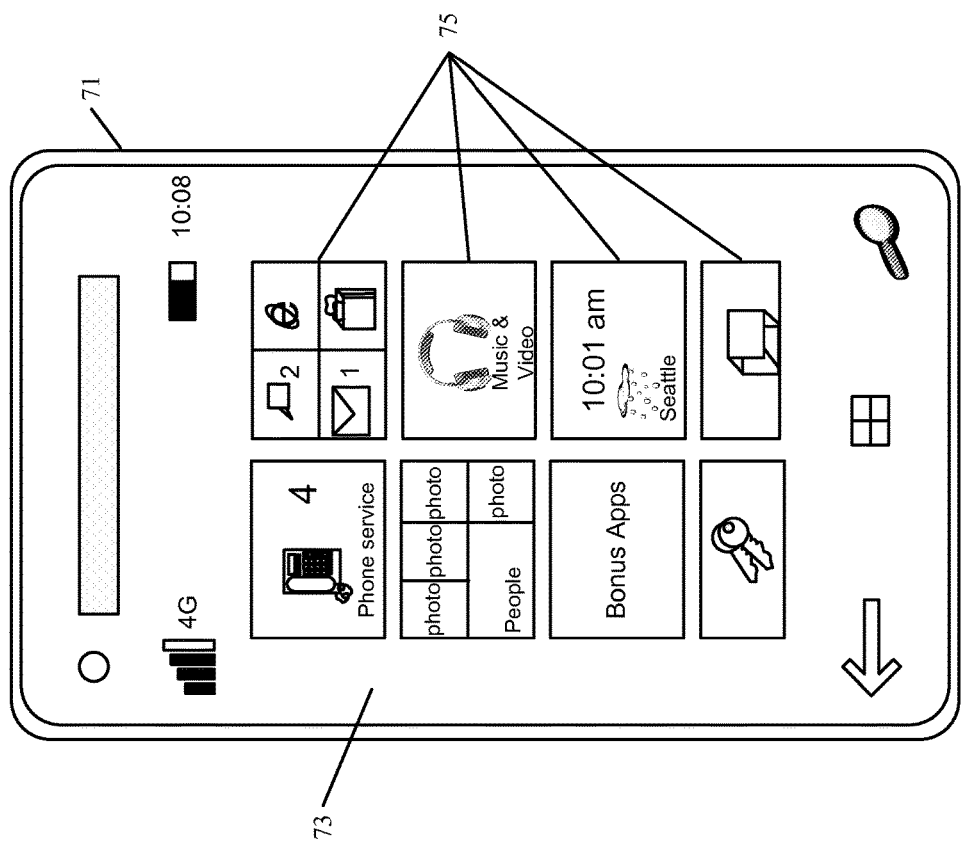

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 102 for use in generating, processing, or displaying the human presence data. FIGS. 11-12 are examples of handheld or mobile devices.

FIG. 10 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one embodiment in which device 16 is a tablet computer 600. In FIG. 11, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
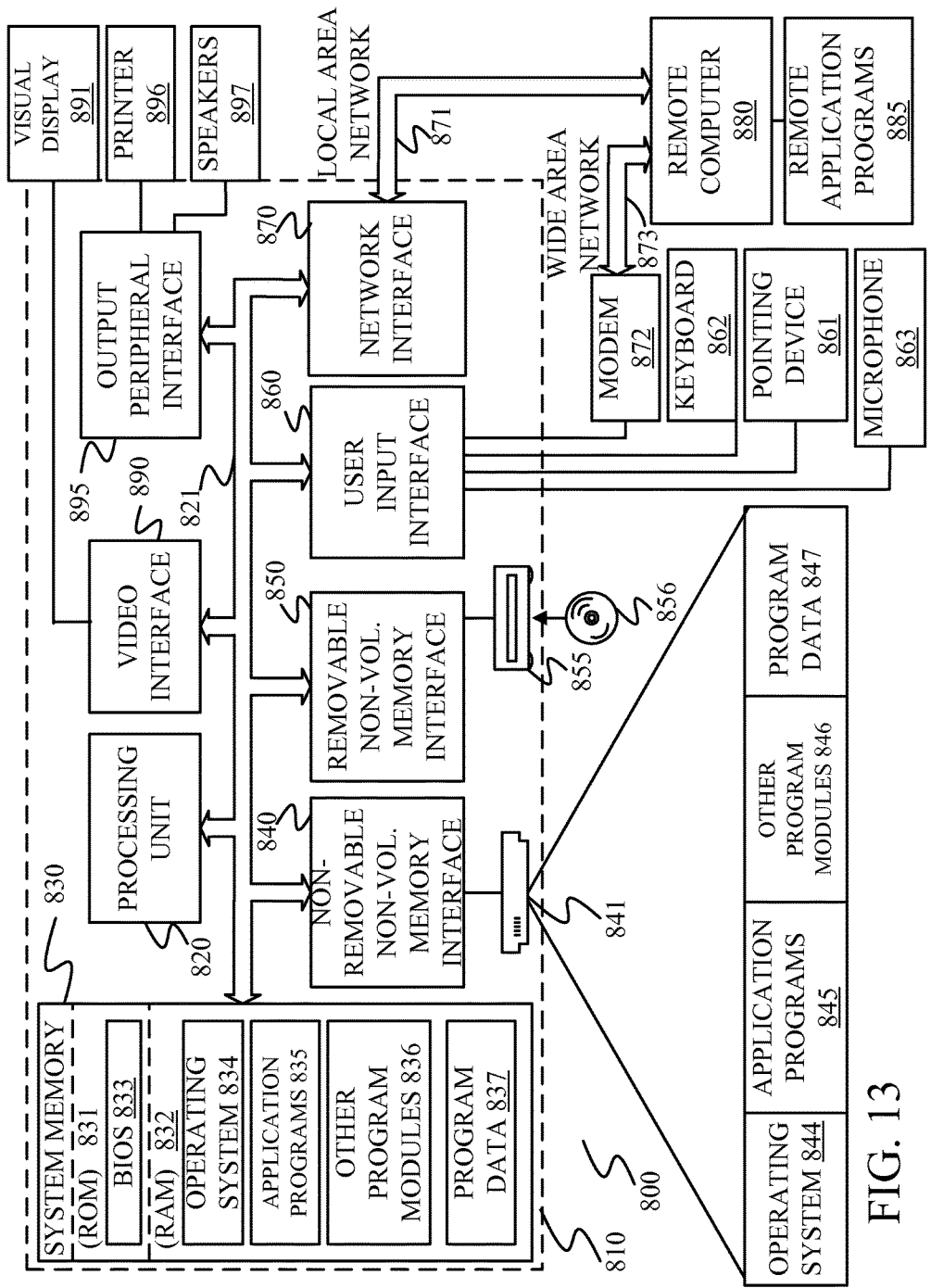
FIG. 13 is a block diagram of one example of a computing environment that can be used in the architecture shown in FIG. 1.

FIG. 13 is one example of a computing environment in which elements of FIG. 1, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processor 118), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, cab area network—CAN, or wide area network—WAN) to one or more remote computers, such as a remote computer 880.

When used in a LAN networking environment, the computer 810 is connected to the LAN 871 through a network interface or adapter 870. When used in a CAN networking environment, computer 810 is connected to the CAN through a suitable interface or adapter. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine, comprising:
an optical sensor that generates an optical sensor signal indicative of an optical image of a field of regard in a forward direction, relative to a direction of travel of the mobile machine;
a thermal sensor that generates a thermal sensor signal indicative of a thermal characteristic of the field of regard in the forward direction;
an additional sensor that generates an additional sensor signal indicative of an additional sensed characteristic of the field of regard in the forward direction;
an environmental sensor that generates an environmental sensor signal indicative of an environmental characteristic proximate the mobile machine; and
a human presence detection system that receives values indicative of the optical sensor signal, the thermal sensor signal, the additional sensor signal and the environmental sensor signal, generates a human presence metric, based on the received values, the human presence metric having a metric value indicative of human presence in the field of regard, and the human presence detection system generating an action signal based on the human presence metric.

Example 2 is the mobile machine of any or all previous examples wherein the human presence detection system comprises:
a sensor weighting component that determines a contribution of the received values for the optical sensor signal, the thermal sensor signal and the additional sensor signal, to the human presence metric, based on the received value for the environmental sensor signal.

Example 3 is the mobile machine of any or all previous examples wherein the human presence detection system comprises:
a metric generator component that generates the human presence metric based on the contributions of the received values.

Example 4 is the mobile machine of any or all previous examples wherein the environmental characteristic sensed by the environmental sensor is indicative of an accuracy with which at least one of the optical sensor, the thermal sensor and the additional sensor can sense human presence in the field of regard.

Example 5 is the mobile machine of any or all previous examples wherein the environmental sensor comprises:
an obscurant sensor that generates the environmental sensor signal as an obscurant sensor signal indicative of a presence of an optical obscurant in the field of regard, the sensor weighting component determining the contribution, to the human presence metric, of the received value for the optical sensor signal based on the obscurant sensor signal.

Example 6 is the mobile machine of any or all previous examples wherein the environmental sensor comprises:
an ambient temperature sensor that generates the environmental sensor signal as an ambient temperature sensor signal indicative of an ambient temperature proximate the field of regard, the sensor weighting component determining the contribution, to the human presence metric, of the received value for the thermal sensor signal based on the ambient temperature sensor signal.

Example 7 is the mobile machine of any or all previous examples wherein the additional sensor comprises:
a capacitive sensor that generates the additional sensor signal as a capacitance sensor signal indicative of sensed capacitance in the field of regard.

Example 8 is the mobile machine of any or all previous examples wherein the environmental sensor comprises:
a standing water sensor that generates the environmental sensor signal as a standing water sensor signal indicative of a presence of standing water in the field of regard, the sensor weighting component determining the contribution, to the human presence metric, of the received value for the capacitance sensor signal based on the standing water sensor signal.

Example 9 is the mobile machine of any or all previous examples wherein the standing water sensor comprises:
a precipitation sensor that senses precipitation in the field of regard.

Example 10 is the mobile machine of any or all previous examples wherein the standing water sensor comprises:
a position sensor that senses a position of the mobile machine, and wherein the sensor weighting component receives weather information and map information and generates an estimate of whether standing water is present in the field of regard based on the weather information, the map information and the position of the mobile machine.

Example 11 is the mobile machine of any or all previous examples and further comprising:
an image processing system that performs color and structural segmentation processing on the optical sensor signal.

Example 12 is the mobile machine of any or all previous examples wherein the additional sensor comprises:
a firmness sensor that senses a firmness of objects proximate the mobile machine in the forward direction of the mobile machine.

Example 13 is a method, comprising:
sensing an optical image of a field of regard in a forward direction, relative to a direction of travel of a mobile machine;
sensing a thermal characteristic of the field of regard in the forward direction;
sensing an additional characteristic of the field of regard in the forward direction;
sensing an environmental characteristic proximate the mobile machine;
generating a human presence metric, based on the sensed optical image, the sensed thermal characteristic and the sensed additional characteristic, the human presence metric having a metric value indicative of human presence in the field of regard; and
generating an action signal based on the human presence metric.

Example 14 is the method of any or all previous examples wherein generating an action signal comprises:
controlling a user interface system to surface an indication of the human presence metric for user interaction.

Example 15 is the method of any or all previous examples wherein the mobile machine includes a set of controlled systems and a control system that controls the set of controlled systems, and wherein generating an action signal comprises:

generating a control signal to control the controlled systems based on the human presence metric.

Example 16 is the method of any or all previous examples wherein generating a control signal comprises:
generating a stop signal to stop travel of the mobile machine based on the human presence metric.

Example 17 is the method of any or all previous examples wherein generating a control signal comprises:
generating a steering signal to change a course of the mobile machine based on the human presence metric.

Example 18 is the method of any or all previous examples wherein generating the control signal comprises:
generating a position change signal to change a position of a ground engaging portion of the mobile machine based on the human presence metric.

Example 19 is the method of any or all previous examples wherein at least one of the steps of sensing an optical image, sensing a thermal characteristic, sensing an additional characteristic and sensing an environmental characteristic are performed on a remote machine that is separate from the mobile machine.

Example 20 is a mobile machine, comprising:
an optical sensor that generates an optical sensor signal indicative of an optical image of a field of regard in a forward direction, relative to a direction of travel of the mobile machine;
a thermal sensor that generates a thermal sensor signal indicative of a thermal characteristic of the field of regard in the forward direction;
an additional sensor that generates an additional sensor signal indicative of an additional sensed characteristic of the field of regard in the forward direction;
an environmental sensor that generates an environmental sensor signal indicative of an environmental characteristic proximate the mobile machine;
a sensor weighting component that determines a weight corresponding to each of the received values for the optical sensor signal, the thermal sensor signal and the additional sensor signal, based on the received value for the environmental sensor signal;
a human presence metric generator component that generates a human presence metric based on the contributions of the received values, the human presence metric having a metric value indicative of human presence in the field of regard; and
an action signal generator component that generates an action signal based on the human presence metric.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
an optical sensor that generates an optical sensor signal indicative of an optical image of a field of regard in a forward direction, relative to a direction of travel of the mobile machine;
a thermal sensor that generates a thermal sensor signal indicative of a thermal characteristic of the field of regard in the forward direction;
a capacitive sensor that generates capacitance sensor signal indicative of sensed capacitance in the forward direction;
standing water sensor that generates a standing water sensor signal indicative of a presence of standing water in the field of regard;
an obscurant sensor that generates an obscurant sensor signal indicative of a presence of an optical obscurant in the field of regard;
an ambient temperature sensor that generates an ambient temperature sensor signal indicative of an ambient temperature proximate the field of regard;
a sensor weighting component that generates a visibility factor based on the obscurant sensor signal and applies the visibility factor to the optical sensor signal to obtain a net optical contribution of received values of the optical sensor signal, the sensor weighting component generating a net thermal contribution of received values of the thermal sensor signal based on the ambient temperature sensor signal, and the sensor weighting component generating a net capacitance contribution, to the human presence metric, for the capacitance sensor signal based on the standing water sensor signal; and
a human presence detection system that receives the net optical contribution, the net thermal contribution and the net capacitance contribution and generates a human presence metric, based on the net optical contribution, the net thermal contribution and the net capacitance contribution, the human presence metric having a metric value indicative of human presence in the field of regard, and the human presence detection system generating an action signal based on the human presence metric.

2. The mobile machine of claim 1 wherein the human presence detection system comprises:
a metric generator component that generates the human presence metric.

3. The mobile machine of claim 1 wherein the standing water sensor comprises:
a precipitation sensor that senses precipitation in the field of regard.

4. The mobile machine of claim 1 wherein the standing water sensor comprises:
a position sensor that senses a position of the mobile machine, and wherein the sensor weighting component receives weather information and map information and generates an estimate of whether standing water is present in the field of regard based on the weather information, the map information and the position of the mobile machine.

5. The mobile machine of claim 1 and further comprising:
an image processing system that performs color and structural segmentation processing on the optical sensor signal.

6. The mobile machine of claim 1 wherein the additional sensor comprises:
a firmness sensor that senses a firmness of objects proximate the mobile machine in the forward direction of the mobile machine.

7. A method, comprising:
sensing an optical image of a field of regard in a forward direction, relative to a direction of travel of a mobile machine;
sensing a thermal characteristic of the field of regard in the forward direction;
sensing a capacitive characteristic of the field of regard in the forward direction;
sensing an environmental characteristic proximate the mobile machine;

sensing a location of the mobile machine;
receiving topographical information of the field of regard;
receiving weather history information for the field of regard;
generating a standing water factor based on the topographical and weather history information;
generating a net optical contribution based on the sensed optical image and the environmental characteristics;
generating a net capacitive contribution based on the sensed capacitive characteristic, the location of the mobile machine and the standing water factor;
generating a human presence metric, based on the net optical contribution, the net capacitive contribution and the thermal characteristic the human presence metric having a metric value indicative of human presence in the field of regard; and
generating an action signal based on the human presence metric.

8. The method of claim 7 wherein generating an action signal comprises:
controlling a user interface system to surface an indication of the human presence metric for user interaction.

9. The method of claim 7 wherein the mobile machine includes a set of controlled systems and a control system that controls the set of controlled systems, and wherein generating an action signal comprises:
generating a control signal to control the controlled systems based on the human presence metric.

10. The method of claim 9 wherein generating a control signal comprises:
generating a stop signal to stop travel of the mobile machine based on the human presence metric.

11. The method of claim 9 wherein generating a control signal comprises:
generating a steering signal to change a course of the mobile machine based on the human presence metric.

12. The method of claim 9 wherein generating the control signal comprises:
generating a position change signal to change a position of a ground engaging portion of the mobile machine based on the human presence metric.

13. The method of claim 7 wherein at least one of the steps of sensing an optical image, sensing a thermal characteristic, sensing a capacitive characteristic and sensing an environmental characteristic are performed on a remote machine that is separate from the mobile machine.

14. A mobile machine, comprising:
a first set of sensors indicative of a human presence, the first set of sensors comprising:
an optical sensor that generates an optical sensor signal indicative of an optical image of a field of regard in a forward direction, relative to a direction of travel of the mobile machine;
a thermal sensor that generates a thermal sensor signal indicative of a thermal characteristic of the field of regard in the forward direction; and
a capacitive sensor that generates a capacitance sensor signal indicative of sensed capacitance in the field of regard;
a second set of sensors indicative of environmental characteristics proximate the mobile machine, the second set of sensors comprising:
an obscurant sensor that generates an obscurant sensor signal indicative of a presence of a visual obscurant proximate the mobile machine;
an ambient temperature sensor that generates an ambient temperature sensor signal indicative of an ambient temperature proximate the mobile machine; and
a standing water sensor that generates a standing water factor indicative of standing water proximate the mobile machine based on a sensed location of the mobile machine;
a sensor weighting component that determines a first weighted value corresponding to the optical sensor signal based on the obscurant sensor signal, a second weighted value corresponding to the thermal sensor signal based on the ambient temperature sensor signal, and a third weighted value corresponding to the capacitive sensor signal based on the standing water factor;
a human presence metric generator component that generates a human presence metric based on the first weighted value, the second weighted value, and the third weighted value, the human presence metric having a metric value indicative of human presence in the field of regard; and
an action signal generator component that generates an action signal based on the human presence metric.

15. A mobile machine, comprising:
a capacitive sensor that generates a capacitance sensor signal indicative of a sensed capacitance in a field of regard in a forward direction, relative to a direction of travel of the mobile machine;
a standing water sensor that generates a standing water sensor signal indicative of a presence of standing water in the field of regard;
a sensor weighting component that generates a net capacitance contribution, to a human presence metric, for the sensed capacitance based on the standing water sensor signal; and
a human presence detection system that receives the net capacitance contribution and generates the human presence metric based on the sensed capacitance and the net capacitance contribution, the human presence metric having a metric value indicative of a human presence in the field of regard, and the human presence detection system generating an action signal based on the human presence metric.

* * * * *